(12) United States Patent
McCree et al.

(10) Patent No.: US 7,778,408 B2
(45) Date of Patent: Aug. 17, 2010

(54) METHOD AND APPARATUS FOR ACOUSTIC ECHO CANCELLATION UTILIZING DUAL FILTERS

(75) Inventors: Alan V. McCree, Acton, MA (US);
Takahiro Unno, Richardson, TX (US);
Thierry Le Gall, Guipavas (FR);
Sebastien Guiriec, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 1085 days.

(21) Appl. No.: 11/323,567

(22) Filed: Dec. 30, 2005

(65) Prior Publication Data

US 2006/0147032 A1 Jul. 6, 2006

Related U.S. Application Data

(60) Provisional application No. 60/640,690, filed on Dec. 30, 2004.

(51) Int. Cl.
*H04M 9/08* (2006.01)

(52) U.S. Cl. .................. 379/406.08; 381/66; 381/71.11
(58) Field of Classification Search ..........................
379/406.01–406.16, 41; 370/289; 455/570;
381/66, 71.1, 71.2, 71.6, 71.4, 71.5, 71.7, 381/71.11, 71.12
See application file for complete search history.

(56) References Cited

U.S. PATENT DOCUMENTS

| 5,345,119 | A  | * | 9/1994  | Khoury  | 327/553    |
| 5,737,409 | A  | * | 4/1998  | Inoue   | 379/410    |
| 6,947,549 | B2 | * | 9/2005  | Yiu et al. | 379/406.01 |
| 7,453,921 | B1 | * | 11/2008 | Gossett | 375/147    |

* cited by examiner

*Primary Examiner*—Vivian Chin
*Assistant Examiner*—Leshui Zhang
(74) *Attorney, Agent, or Firm*—Mima Abyad; W. James Brady; Frederick J. Telecky, Jr.

(57) ABSTRACT

Hands-free phones with echo cancellation using dual filters, one fast adapting filter and one slow adapting filter; the choice of filters includes switching with hysteresis from recent performance, and the fast adapting filter has step size control to limit relative filter update energy and the slow adapting filter limits filter divergence.

7 Claims, 4 Drawing Sheets

METHOD AND APPARATUS FOR ACOUSTIC ECHO CANCELLATION UTILIZING DUAL FILTERS

CROSS-REFERENCE TO RELATED APPLICATIONS

This application claims priority from provisional patent application No. 60/640,690, filed Dec. 30, 2004. The following co-assigned copending patent application discloses related subject matter: application Ser. No. 11/165,903, filed Jun. 24, 2005.

BACKGROUND OF THE INVENTION

The present invention relates to signal processing, and more particularly to echo cancellation devices and methods.

Hands-free telephones (e.g., speakerphones) provide conveniences such as conversations while driving an automobile and teleconferencing with multiple speakers at a single phone. However, acoustic reflections of the loudspeaker output of a hands-free phone to its microphone input simulate another participant speaker and thus appear as an echo to the original remote speaker. Acoustic echo cancellation and echo suppression attempt to minimize these effects.

Acoustic echo cancellation (AEC) methods approximate the properties of the loudspeaker-to-microphone acoustic channel and thereby can generate an approximation of the microphone pickup of sounds emitted by the loudspeaker. Then this approximation can be cancelled from the actual microphone pickup. Acoustic echo cancellation typically uses adaptive filtering to track the varying acoustic channel; see U.S. Pat. No. 5,633,936. FIGS. 2a-2b illustrate the acoustic channel and the adaptive filter. Such a system requires fast filter convergence as the acoustic channel varies and separation of the echo from near-end sources such as speech or noise.

Various methods for filter definition and fast convergence have been proposed, including normalized least mean squares with input decorrelation or affine projection. See for example, Doherty et al, A Robust Echo Canceler for Acoustic Environments, 44 IEEE Trans. Circuits Systems 389 (1997) and Dutweiler, Proportionate Normalized Least-Mean-Squares Adaptation in Echo Cancellers, 8 IEEE Tran. Speech Audio Proc. 508 (2000).

However, these approaches still have problems of insufficient performance.

SUMMARY OF THE INVENTION

The present invention provides echo cancellation with dual estimation filters having fast and slow adaptations plus hysteresis switching between filters.

This has advantages including improved performance.

DESCRIPTION OF THE PREFERRED EMBODIMENTS

1. Overview

Figure 1A:
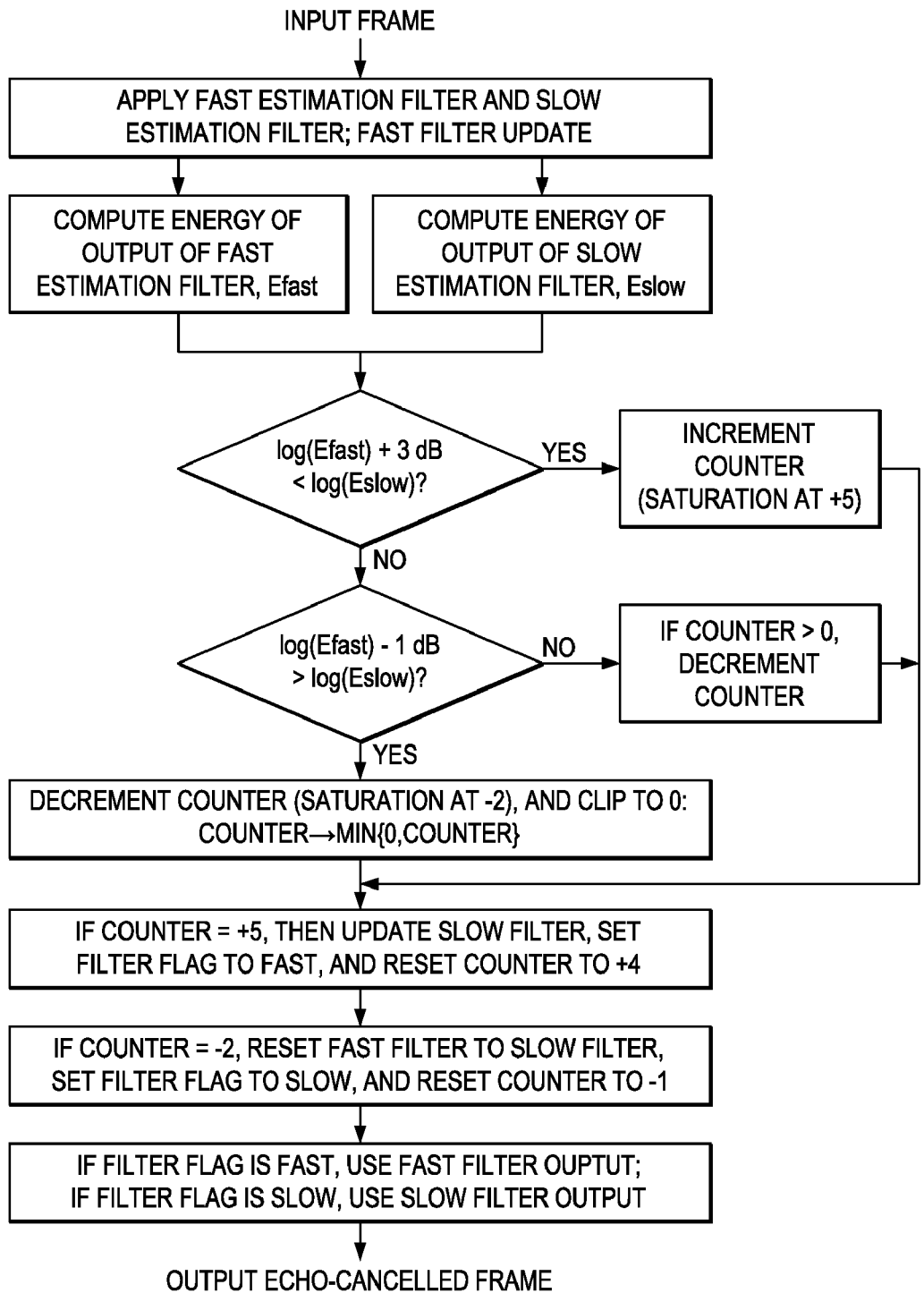
FIGS. 1a-1c illustrate an implementation for a preferred embodiment method.
Figure 1B:
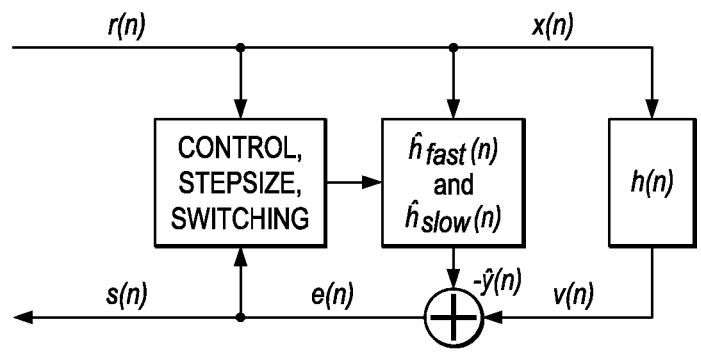

FIG. 1b illustrates functional blocks of a preferred embodiment system for echo cancellation as could be used in a hands-free phone. In particular, the left-hand edge of FIG. 1b shows connections to a wire network for receiving downlink input r(n) from a remote source and transmitting an uplink output s(n) back to the remote source; and the right-hand edge shows the far-end signal x(n) to drive a loudspeaker, the acoustic channel impulse response h(n), and a near-end signal v(n). The near-end signal consists of the sum of a local source, the acoustic channel response of the loudspeaker output, plus local noise. The echo cancellation uses two adaptive filters, fast-adapting $\hat{h}_{fast}(n)$ and slow-adapting $\hat{h}_{slow}(n)$, to estimate the acoustic channel with a controlled switching between the filters together with a filter adaptation step size control. FIG. 1a is a flow diagram for the switching control of the adaptive filters.

Figure 3:
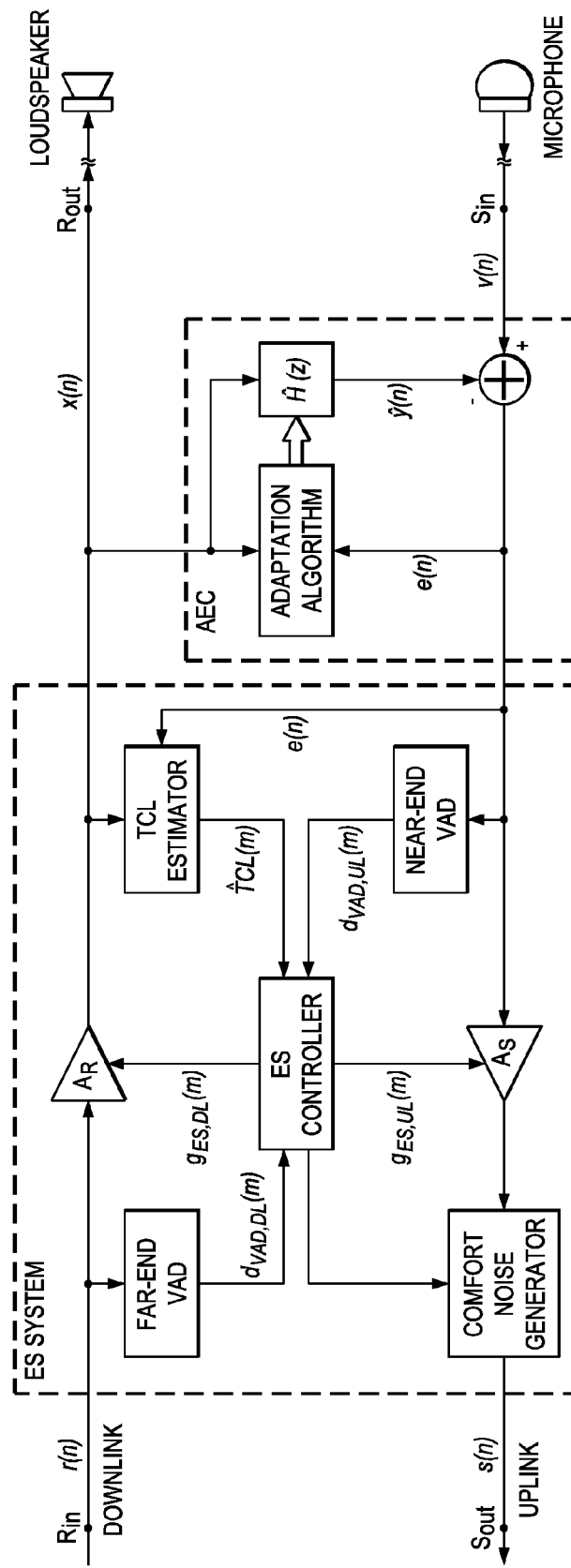
FIG. 3 shows echo cancellation together with echo suppression.

FIG. 3 illustrates an echo cancellation system with the addition of echo suppression in the center plus left-hand portion including gain (attenuation) control for both received ($A_R$) and sent ($A_S$) signals plus (optional) comfort noise generation. Digital-to-analog and analog-to-digital conversions (as in the loudspeaker and microphone) are not explicitly shown; and any digital speech compression-decompression would occur at the left-hand edge for the network transmission-reception and also is not explicitly shown.

The preferred embodiment methods can be performed with digital signal processors (DSPs) or general purpose programmable processors or application specific circuitry, and these can be combined into systems on a chip such as both a DSP and RISC processor on the same chip with the RISC processor controlling operations. A stored program in an onboard ROM or external flash EEPROM for a DSP or programmable processor could perform the signal processing. Analog-to-digital converters and digital-to-analog converters provide coupling to the real world, and modulators and demodulators (plus antennas for air interfaces) provide coupling for transmission waveforms. The speech can be encoded, packetized, and transmitted over networks such as the Internet.

2. Acoustic Echo Cancellation with Adaptive Channel Estimation

Preferred embodiment echo cancellation methods use a variant of the normalized LMS (least mean squares) method for adaptation of an acoustic channel estimation filter. Thus first consider the LMS method and FIGS. 2a-2b. Initially, presume a sampling interval of T, so time t is expressed as integer n with $t=t_0+nT$ where $t_0$ is an initial time. As notation, let r(n) be the received downlink sample at time n at probe point $R_{in}$; x(n) be the far-end sample applied to loudspeaker at probe point $R_{out}$; and v(n) be the near-end signal at probe point $S_{in}$ where v(n) comprises u(n), the near-end speech, $n_0(n)$, the near-end noise, plus y(n), the echo of x(n) received through the acoustic channel. Further, let $\hat{y}(n)$ be the acoustic channel estimation filter output; let e(n) be the acoustic echo cancellation (AEC) error signal; and let s(n) be the send-out uplink signal at probe point $S_{out}$. The AEC model presumes linearity:

$$v(n)=u(n)+y(n)+n_0(n)$$

$$e(n)=v(n)-y(n)$$

And when there is no further signal processing in the downlink or uplink (compare FIG. 3 illustrating echo suppression attenuations $A_R$ and $A_S$):

$$x(n)=r(n)$$

$$s(n)=e(n)$$

Let $\{h_k(n): k=0, 1, \ldots, N-1\}$ denote the coefficients of the length-N impulse response of the acoustic channel (from the loudspeaker input to the microphone output) at time n. Typically, filters of length N=100-200 would be used in small echo environments, such as a car interior, and longer filters in larger echo environments. Further, N=256 would be a convenient size when various computations (convolutions and correlations) are performed in the transform domain. The digital data may be 64-bit floating point or 16-bit fixed-point or any other convenient size.

It is convenient to express the acoustic channel impulse response as a length-N vector:

$$h(n) = \begin{bmatrix} h_0(n) \\ \vdots \\ h_k(n) \\ \vdots \\ h_{N-1}(n) \end{bmatrix}$$

Similarly, let $\hat{h}(n)=\{\hat{h}_k(n)\}$ denote the acoustic channel estimation filter impulse response; ideally, $\hat{h}(n)$ closely approximates h(n). And as an N-vector the echo estimation filter is:

$$\hat{h}(n) = \begin{bmatrix} \hat{h}_0(n) \\ \hat{h}_1(n) \\ \hat{h}_2(n) \\ \vdots \\ \hat{h}_{N-1}(n) \end{bmatrix}$$

Figure 2A:
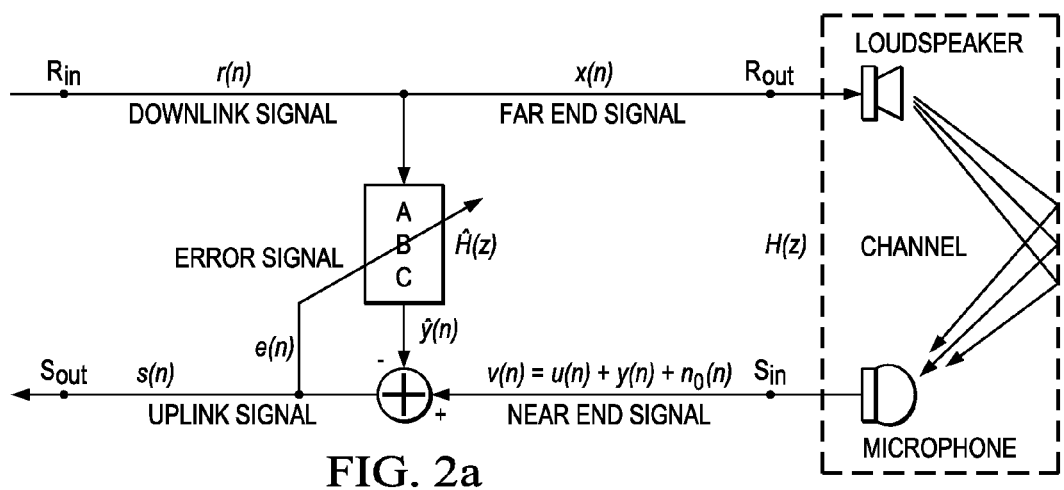
FIGS. 2a-2b show echo cancellation features.
Figure 2B:
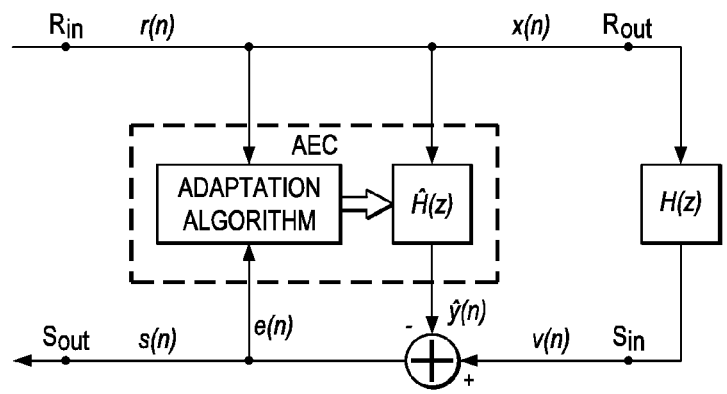

FIGS. 2a-2b (and 3) indicate the filter by $\hat{H}(z)$, its z-transform.

Now let x(n) denote the far-end observation vector; that is, at time n the last N far-end samples:

$$x(n) = \begin{bmatrix} x(n) \\ \vdots \\ x(n-k) \\ \vdots \\ x(n-N+1) \end{bmatrix}$$

Without echo suppression the far-end observation vector is the same as the downlink observation vector, r(n).

Linearity of the acoustic channel implies:

$$y(n) = \Sigma_{0 \le k < N} h_k(n) x(n-k)$$
$$= \langle h(n) | x(n) \rangle$$

where $\langle | \rangle$ denotes the inner (scalar) product of two N-vectors. Similarly, define the echo approximation:

$$\hat{y}(n) = \Sigma_{0 \le k < N} \hat{h}_k(n-1) x(n-k)$$
$$= \langle \hat{h}(n-1) | x(n) \rangle$$

where $\hat{h}(n-1)$ is used for the echo estimate because the current acoustic channel estimate is not available until the echo estimate is computed. AEC attempts to remove the echo signal, y(n), from the near-end signal, v(n), by subtraction of the echo estimate, ŷ(n), from v(n) to yield e(n). Then the AEC updates the acoustic channel estimate filter from $\hat{h}(n-1)$ to $\hat{h}(n)$ using e(n).

The LMS method updates the acoustic channel estimation filter $\hat{h}(n)$ by minimizing (with respect to filter coefficients) the expected error for random inputs:

$$\hat{h}(n) = \arg\min_{\hat{h}} \{E[|v(n) - \hat{h}|x(n)|^2]\}$$

where E denotes the expectation. This yields a steepest-descent type of update:

$$\hat{h}(n) = \hat{h}(n-1) + \mu(n) e(n) x(n)$$

where μ(n) is a positive "step size" parameter to scale the gradient. The step size determines convergence rate and filter stability; μ(n) could be a constant roughly equal to 0.1. Variants of the LMS method allow μ(n) to depend upon parameters such as the estimated noise power and $\|x(n)\|^2$ ($|x(n)|^2$ equals x(n)|x(n)). In particular, the normalized LMS method may have:

$$\hat{h}(n) = \hat{h}(n-1) + \mu e(n) x(n) / \|\mu x(n)\|^2$$

$1^{st}$-order decorrelation methods improve filter convergence by preprocessing the input through a decorrelation of x(n) with respect to x(n-1). In particular, define $x_{dc}(n) = x(n) - c(n) x(n-1)$ where c(n) is the decorrelation coefficient:

$$c(n) = \langle x(n) | x(n-1) \rangle / \langle x(n-1) | x(n-1) \rangle$$
$$= \langle x(n) | x(n-1) \rangle / \|x(n-1)\|^2$$

Of course, c(n) x(n-1) is the projection of x(n) onto the subspace spanned by x(n-1), so the decorrelation replaces x(n) by its projection $x_{dc}(n)$ onto the orthogonal complement of the span of x(n-1).

The normalized decorrelating LMS filter update is then $$\hat{h}(n) = \hat{h}(n-1) + \mu e(n) x_{dc}(n) / \langle x_{dc}(n) | x(n) \rangle$$
$$= \hat{h}(n-1) + \mu e(n) x_{dc}(n) / \|x_{dc}(n)\|^2$$

where $\|x(n)\|^2 = \|x(n-1)\|^2$ was assumed for simplicity.

And thus the optimal update is $\mu e(n) x_{dc}(n) / \langle x_{dc}(n) | x(n) \rangle$.

Affine projection methods generalize this decorrelation approach by use of more prior input samples together with a conjugate gradient. Indeed, for the simplest second-order affine projection method the optimal filter update is:

$$\hat{h}(n) = \hat{h}(n-1) + \mu X(n) [X(n)^H X(n)]^{-1} e(n)$$

where X(n) is the N×2 matrix with columns x(n) and x(n-1) and e(n) is the 2×1 vector of components $e_0(n)$ and $e_1(n)$ with $$e_0(n) = v(n) - \langle \hat{h}(n-1) | x(n) \rangle$$

$$e_1(n) = v(n-1) - \langle \hat{h}(n-1) | x(n-1) \rangle$$

The 2×2 matrix $X(n)^H X(n)$ has off-diagonal elements equal to the correlation between $x(n)$ and $x(n-1)$:

$$X(n)^H X(n) = \begin{bmatrix} \|x(n)\|^2 & \langle x(n) | x(n-1) \rangle \\ \langle x(n) | x(n-1) \rangle & \|x(n-1)\|^2 \end{bmatrix}$$

The inverse is simply $$[X(n)^H X(n)]^{-1} = (1/det) \begin{bmatrix} \|x(n-1)\|^2 & -\langle x(n) | x(n-1) \rangle \\ -\langle x(n) | x(n-1) \rangle & \|x(n)\|^2 \end{bmatrix}$$

where det is the determinant of the 2×2 matrix. Hence, the update becomes:

$$\hat{h}(n) = \hat{h}(n-1) + e_0(n)\{\|x(n-1)\|^2 x(n) - \langle x(n) | x(n-1) \rangle x(n-1)\}/det + e_1(n)\{\|x(n)\|^2 x(n-1) - \langle x(n) | x(n-1) \rangle x(n)\}/det$$

Note that the first update term uses the forward decorrelation of $x(n)$ with respect to $x(n-1)$ and the second term uses the backward decorrelation of $x(n-1)$ with respect to $x(n)$.

Of course, the optimal updating may be undesirable under certain conditions, such as for the acoustic channel of a hands-free phone at low signal-to-noise ratio (SNR) levels. And consequently, the preferred embodiment methods modify the normalized LMS filter adaptation to (i) spectrally flatten $x(n)$ based on first-order linear predictive whitening which is analogous to decorrelation, (ii) limit stepsize to control adaptation and prevent filter divergence due to near-end signals (doubletalk or acoustic noise), and (iii) select between dual filters to have both rapid filter convergence and protection against filter divergence.

The step size limitation controls the maximum amount of filter change per adaptation update, so that divergence due to bad input signals will be very slow. The dual-filter aspect improves robustness to adaptation divergence by using an older copy of the filter coefficients for filtering and by resetting the fast-adapting filter. Using step size control along with dual filters allows AEC to have moderate step size and provide good divergence control while providing good tracking capability for echo channel change. The following sections detail these modifications.

3. Spectral Flattening

Preferred embodiment AEC filter update methods first apply predictive spectral flattening to the loudspeaker input, $x(n)$, and then use this modified input in a LMS-type update. Initially, define a normalized correlation coefficient, $\lambda$, as:

$$\lambda(n) = \langle x(n-1) | x(n) \rangle / \langle x(n) | x(n) \rangle$$
$$= \langle x(n) | x(n-1) \rangle / \|x(n)\|^2$$

and use $\lambda(n)$ to predictively whiten $x(n)$ by subtracting the normalized correlation to define $x_{wh}(n) = x(n) - \lambda(n) x(n-1)$.

Next, define the AEC filter adaptation update in terms of the predictively-whitened input as:

$$\hat{h}(n) = \hat{h}(n-1) + \text{Step}(n) x_{wh}(n)$$

Then as with the normalized LMS, find the optimal Step(n) factor by minimizing the AEC output error:

$$|v(n) - \langle \hat{h}(n-1) + \text{Step}(n) x_{wh}(n) | x(n) \rangle|^2$$

This yields (again presuming that $\|x(n)\| = \|x(n-1)\|$ which implies $\|x_{wh}(n)\|^2 = (1-\lambda(n)^2)\|x(n)\|^2$) the optimal AEC filter adaptation update, including a step size parameter $\mu$, as:

$$\text{Step}(n) = \mu e(n)/\|x_{wh}(n)\|^2$$

So the optimal update, including parameter $\mu$, is $$\hat{h}(n) = \hat{h}(n-1) + \Delta \hat{h}(n)$$

where $\Delta \hat{h}(n) = \text{Step}(n) x_{wh}(n)$.

4. Step Size Control

Convergence of the adaptive AEC filter is based on the assumption that the only near-end input signal is the echo of the loudspeaker output propagating through the acoustic channel; if there is acoustic noise or the near-end speaker is talking, then the echo cancellation filter can quickly diverge. In a traditional double-talk detector, the energy of the near-end and the far-end signals are compared, and if the near-end energy is too high, then adaptation of the filter is stopped and the filter coefficients are frozen. However, in difficult acoustic echo situations the echo can be so loud as to stop the adaptation, paralyzing the system. In addition, convergence enhancements such as spectral whitening as in forgoing can magnify near-end noise in quiet frequency bands, distorting the estimation process even when the echo appears to be the dominant signal.

To prevent divergence in the presence of near-end signals, preferred embodiment methods monitor the amount of filter adaptation per input sample and limit the amount of filter change defined by the energy in the filter update normalized by the energy in the current filter. That is, consider the relative change $\|\Delta\hat{h}_{sm}(n)\|^2/\|\hat{h}(n-1)\|^2$ where $\Delta\hat{h}_{sm}(n)$ is a smoothed version of $\Delta\hat{h}(n)$ and the update is $\hat{h}(n) = \hat{h}(n-1) + \Delta\hat{h}(n)$. Thus divergence due to bad input signals can be made very slow. Indeed, during periods of strong near-end energy (local speech plus noise), the filter estimate can diverge quickly, which is reflected in large values of $\|\Delta\hat{h}_{sm}(n)\|^2/\|\hat{h}(n-1)\|^2$.

Preferred embodiment step size limit methods limit the relative change to a maximum value of $\Delta_{max}$ by scaling down Step(n) for samples where this limit would be exceeded. This limit ensures that any divergence of the filter will be very slow. In particular, the preferred embodiment AEC filter adaptation update vector relative energy is limited as:

if $\|\Delta\hat{h}_{sm}(n)\|^2 \leq \Delta_{max}\|\hat{h}(n-1)\|^2$
then $\Delta\hat{h}(n)$ unchanged else if $\|\Delta\hat{h}_{sm}(n)\|^2 > \Delta_{max}\|\hat{h}(n-1)\|^2$ then $\Delta\hat{h}(n) = \Delta\hat{h}(n)\sqrt{\Delta_{max}}\|\hat{h}(n-1)\|/\|\Delta\hat{h}_{sm}(n)\|$ Note this rescaled $\Delta\hat{h}(n)$ is then used to recompute $\Delta\hat{h}_{sm}(n)$. For example, a maximum relative filter update per sample of log $\Delta_{max} = -44$ dB experimentally showed filter coefficients tracking an echo path variation increasing at about 3-6 dB per second. This mild limit provides protection against gross divergence while still allowing rapid adaptation. Also, during initialization the filter energy is not yet known so it is set to an absolute energy, for example −28 dB per sample.

Because computing the filter energy $\|\hat{h}(n-1)\|^2$ (and thus the maximum relative filter update vector energy $\Delta_{max}\|\hat{h}(n-1)\|^2$) and the optimal filter update vector energy $\|\Delta\hat{h}(n)\|^2$ for each sample is computationally expensive, preferred embodiments compute the filter energy only once per 20 ms frame (160 samples) and only estimate the optimal filter update vector energy for each sample. In particular, for a frame with samples $n=n_0, n_0+1, n_0+2, \ldots, n_0+159$, compute the filter energy for the first sample: $\|\hat{h}(n_{0-1})\|^2 = \Sigma_{0 \leq k < N} \hat{h}_k(n_{0-1})^2$, and then use $\Delta_{max}\|\hat{h}(n_0-1)\|^2$ as the maximum filter update vector energy for each sample in the frame. Also, at sample n, estimate the optimal filter update vector energy $\|\Delta \hat{h}(n)\|^2$ simply by noting that:

$$\left\|\Delta \hat{h}(n)\right\|^2 = \|\mu e(n) x_{wh}(n) / \|x_{wh}(n)\|^2\|^2$$
$$= \mu e(n) \mu e(n) / \|x_{wh}(n)\|^2$$
$$= \mu e(n) \, \text{Step}(n)$$

where Step(n) was part of the $\Delta \hat{h}(n)$ computation.

Indeed, preferred embodiment computations for each input far-end sample x(n) and near-end sample v(n) use incremental sums within a frame (or other filter energy update interval). The computations could be as follows:

(1) After filter updating from the preceding sample n 1 inputs, the following are in memory (along with the step size parameter μ):

N-vector $\hat{h}(n-1)$ of echo channel estimation filter with N coefficients $\hat{h}_0(n-1), \hat{h}_1(n-1), \ldots, \hat{h}_{N-1}(n-1)$;

N-vector x(n−1) of N most recent far-end inputs: x(n−1), x(n−2), ..., x(n−N);

energy of N-vector x(n−1): $\|x(n-1)\|^2 = x(n-1)^2 + x(n-2)^2 + \ldots + x(n-N)^2$;

scalar product (unnormalized correlation) of N-vectors x(n−1) and x(n−2):

$\langle x(n-1)|x(n-2)\rangle = x(n-1)x(n-2) + x(n-2)x(n-3) + \ldots + x(n-N)x(n-N-1);$ most recent (frame start) computation of estimation filter energy $\|\hat{h}(n_0-1)\|^2$.

(2) Receive nth sample inputs: far-end x(n) and near-end v(n).

(3) Form N-vector x(n) of N most recent far-end inputs from x(n−1) by taking the first component as x(n) and the remaining N−1 components from x(n−1) and disregarding the last component x(n−N).

(4) Compute echo estimation $\hat{y}(n)$ by applying current echo estimation filter $\hat{h}(n-1)$ to x(n); that is, $\hat{y}(n) = \Sigma_{0 \leq k < N} \hat{h}_k(n-1)x(n-k) = \langle \hat{h}(n-1)|x(n)\rangle$.

(5) Compute the echo-cancelled output as $e(n) = v(n) - \hat{y}(n)$.

(6) Update the estimation filter from $\hat{h}(n-1)$ to $\hat{h}(n)$ by following steps (7)-(15).

(7) Compute the scalar product of x(n) and x(n−1) as an update of the scalar product of x(n−1) and x(n−2):

$\langle x(n)|x(n-1)\rangle = x(n)x(n-1) + \langle x(n-1)|x(n-2)\rangle - x(n-N)x(n-N-1).$ (8) Compute the energy of x(n) as an update of the energy of x(n−1):

$\|x(n)\|^2 = x(n)^2 + \|x(n-1)\|^2 - x(n-N)^2.$ (9) Compute the normalized correlation from the foregoing (7)-(8):

$\lambda(n) = \langle x(n)|x(n-1)\rangle / \|x(n)\|^2$

(10) Compute the predictively whitened $x_{wh}(n)$ from the foregoing steps (1), (3), and (9):

$x_{wh}(n) = x(n) - \lambda(n)x(n-1).$

(11) Compute the energy of $x_{wh}(n)$ from (1) and (8)-(9):

$\|x_{wh}(n)\|^2 = \|x(n)\|^2(1-\lambda(n)^2).$ (again, this computation assumes approximation $\|x(n)\|^2 = \|x(n-1)\|^2$)

(12) Compute optimal filter update vector from (5) and (10)-(11):

$$\Delta \hat{h}(n) = \mu e(n) x_{wh}(n) / \|x_{wh}(n)\|^2$$
$$= \text{Step}(n) x_{wh}(n)$$

(13) Compute relative energy of optimal update vector from (5) and (12):

$$\left\|\Delta \hat{h}(n)\right\|^2 = \|\mu e(n) x_{wh}(n) / \|x_{wh(n)}\|^2\|^2$$
$$= \mu e(n) \mu e(n) / \|x_{wh}(n)\|^2$$
$$= \mu e(n) \, \text{Step}(n)$$

(14) Compute $\|\Delta \hat{h}_{sm}(n)\|^2$, the smoothed energy of $\Delta \hat{h}(n)$ if $\|\Delta \hat{h}(n)\|^2 > \|\Delta \hat{h}_{sm}(n-1)\|^2$ then $\|\Delta \hat{h}_{sm}(n)\|^2 = \|\Delta \hat{h}(n)\|^2$ else $\|\Delta \hat{h}_{sm}(n)\|^2 = \alpha\|\Delta \hat{h}_{sm}(n-1)\|^2 + (1-\alpha)\|\Delta \hat{h}(n)\|^2 (\alpha=0.95)$

(15) Compare the smoothed energy $\|\Delta \hat{h}_{sm}(n)\|^2$ from (14) to the estimation filter energy $\|\hat{h}(n_0-1)\|^2$ from (1):

if $\|\Delta \hat{h}_{sm}(n)\|^2 \leq \Delta_{max}\|\hat{h}(n_0-1)\|^2$ then leave $\Delta \hat{h}(n)$ unchanged else $\Delta \hat{h}(n) = \Delta \hat{h}(n)\sqrt{\Delta_{max}}\|\hat{h}(n_0-1)\|/\|\Delta \hat{h}_{sm}(n)\|$

(16) Update the echo channel estimation filter from (1) and (15):

$\hat{h}(n) = \hat{h}(n-1) + \Delta \hat{h}(n).$

(17) Repeat (1)-(16) for next input samples x(n+1) and v(n+1); additionally, if the input samples are at the start of a frame, then compute the energy of the current echo channel estimation filter.

5. Dual Estimation Filters for Acoustic Echo Channel

The dual-path model for the acoustic echo channel estimation uses two AEC filters: a fast-adapting filter based on the foregoing adaptation and step size control and a slow tracking filter based on previous fast-adapting filter coefficients. The fast-adapting filter provides rapid adaptation to any change in the echo path, while the slow filter provides protection against divergence of the adaptation due to the near-end speech or noise. The update of the slow filter, as well as the selection of which filter to use for the current frame output, is based on long-term measurement of the relative echo cancellation performance of both filters.

In particular, a preferred embodiment method, steps illustrated in FIG. 1a, provides a fast-adapting filter $\hat{h}_{fast}$ that updates every sample as described in the foregoing sections 3-4, a slow-tracking filter $\hat{h}_{slow}$ that is constant throughout a frame, a state counter which determines swapping coefficients between the fast and slow filters, and a filter flag that determines which filter's output to use as the AEC output for the frame. The method proceeds as follows, presuming a frame of 160 samples: $n=n_0, n_0+1, n_0+2, \ldots, n_0+159$.

(1) At the start of the frame at sample no the memories contain the N-coefficient fast-adapting filter updated from the immediately prior sample, $\hat{h}_{fast}(n_0-1)$, the current N-coefficient slow-tracking filter updated at the end of the prior frame, $\hat{h}(n_0-1)$, the state counter value in the range −2 to +5, the filter flag value (fast or slow), plus the sample vectors, energies, scalar products, and fast filter energy as described in the foregoing section 4.

(2) Sequentially, for each of the 160 pairs of far-end plus near-end samples, x(n) and v(n), of the frame, apply the fast-adapting filter to the corresponding vector x(n) and generate an AEC output $e_{fast}(n)$ plus a fast filter update as in section 4. This yields a frame of AEC outputs, $e_{fast}(n_0)$, $e_{fast}(n_0+1)$, $e_{fast}(n_0+2)$, ..., $e_{fast}(n_0+159)$, plus a final fast-adapting filter $\hat{h}_{fast}(n_0+159)$, together with updated memories.

(3) Apply the current slow filter, $\hat{h}_{slow}(n_0-1)$, to re-filter the samples in the frame to yield AEC outputs $e_{slow}(n_0)$, $e_{slow}(n_0+1)$, $e_{slow}(n_0+2)$, ..., $e_{slow}(n_0+159)$. Note that the slow filter is constant throughout the frame, so there is no updating within the frame.

(4) Compute the energies of both the fast filter and slow filter AEC outputs for the frame: $E_{fast} = \Sigma_{0 \leq k \leq 159} e_{fast}(n_0+k)^2$ and $E_{slow} = \Sigma_{0 \leq k \leq 159} e_{slow}(n_0+k)^2$.

Figure 1C:
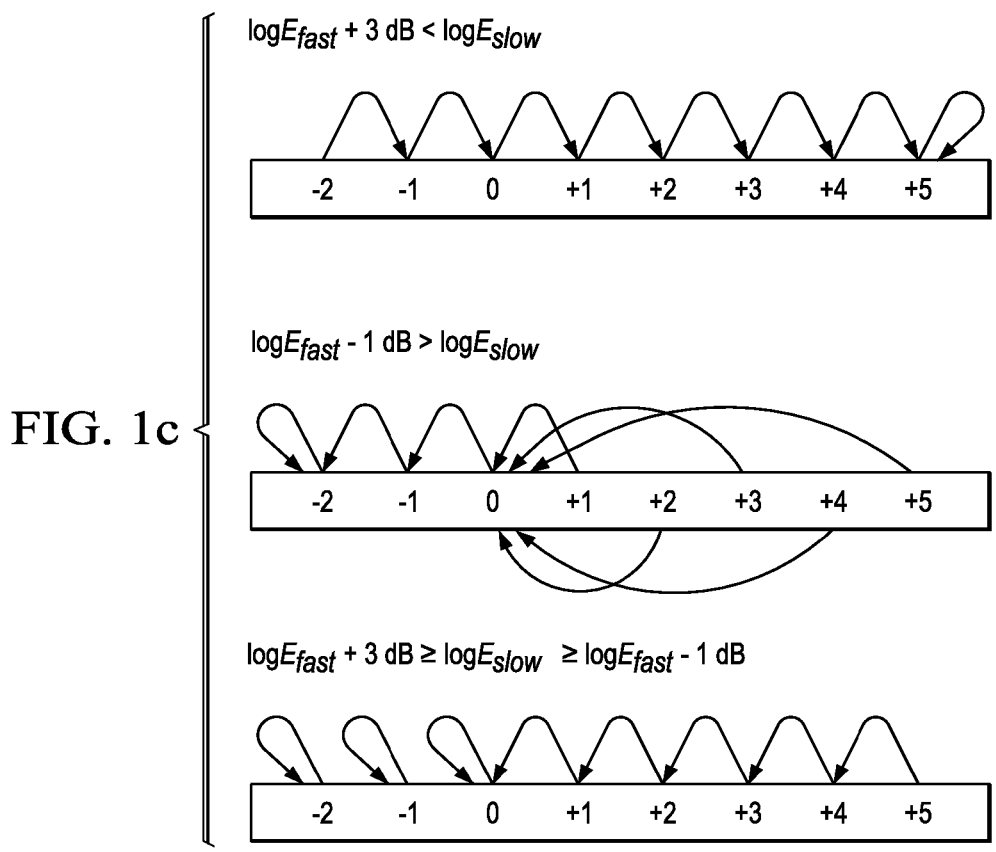

(5) Adjust the state counter value as follows (FIG. 1c heuristically illustrates the counter increment/decrement and clipping):

(a) If $\log E_{fast}+3$ dB$<\log E_{slow}$, then increment the state counter by +1. In this case the fast-adapting filter has good performance for this frame as compared to the slow-tracking filter. Large positive values of the state counter reflect long-term better performance by the fast-adapting filter as compared to the slow-tracking filter. The state counter saturates in the upward direction at +5.

(b) If $\log E_{fast}-1$ dB$>\log E_{slow}$, then decrement the state counter by −1, and clip the state counter to non-positive values; that is, state counter→min{0, state counter}. In this case the fast-adapting filter performance is much worse than the slow tracking filter performance. The state counter saturates downwards at −2.

(c) If neither (a) nor (b) applies and when the state counter is positive, then decrement the state counter by −1. This prevents AEC from updating the slow-adapting filter very frequently.

(d) If neither (a) nor (b) applies and when the state counter is non-positive, then make no change.

(6) Update the filters and filter flag (a) when the state counter is at +5, the fast-adaptation has been performing well over the recent long-term, so both (i) set the filter flag to fast and (ii) update the slow filter coefficients using the current fast-adapting filter coefficients.

In particular, take $\hat{h}_{slow}(n_0+159)=(1\alpha)\hat{h}_{slow}(n_01)+\alpha\hat{h}_{fast}(n_0+159)$, where α is a step size, typically equal to about 0.125, to prevent rapid change in the slow filter coefficients. Then, the state counter is reset to +4 to keep the counter near the upper saturation but also to help decrement when the fast and slow filters have comparable performance in the next frame as in foregoing (5)(c).

(b) when the state counter value is at −2, the fast filter is diverging, and so both (i) set the filter flag to slow and (ii) reset the fast filter coefficients to equal the slow filter coefficients. That is, take $\hat{h}_{fast}(n_0+159)=\hat{h}_{slow}(n_0+159)$. Then the state counter is reset to −1 to keep the counter near the bottom.

(c) when the state counter value is between −2 and +5, leave both (i) the filter flag and (ii) the filters unchanged; this provides hysteresis.

Note that seven successive frames (a total of 140 ms for 20 ms frames) with the fast filter outperforming the slow filter by 3 dB will ensure the filter flag is set to fast and the slow filter (slowly) updated towards the fast filter; whereas, three successive frames with the slow filter outperforming the fast filter by 1 dB will ensure the filter flag is set to slow and the fast filter set equal to the slow filter.

The use of step size control with dual filters allows preferred embodiment AEC to have good tracking capability while providing good divergence control. Without dual filters, there is a trade-off between divergence control (need small $\Delta_{max}$) and tracking capability (need large $\Delta_{max}$). With dual filters, the AEC can use a relatively large $\Delta_{max}$ for better tracking capability because the fast filter divergence can be suppressed by the slow-adapting filter. Also, the asymmetry of the counter increments/decrements and the filter updates helps the combination of good tracking with divergence protection.

6. Modifications

The preferred embodiments may be modified while retaining one or more of the features of step size control for both fast and slow filter adaptations with switching between filters according to performance.

For example, the spectral whitening could be omitted and a differing fast-adapting filter updating method used; the various values such as counter increment/decrement size, counter saturation limits, filter flag switch points, adaptation factors, filter change limit, frame size, and so forth could each be varied; the counter scale could be translated (e.g., no negative values) and/or inverted; various computations such as the slow filtering could be performed in a frequency domain by use of a transform such as the FFT; the filters could be partitioned into subfilters for low latency computations; a measure differing from energy could be used to compare the performance of the fast and slow filters, such as sum of absolute values of the outputs; the relative filter change limit $\Delta_{max}$ could be made adaptive; and so forth. The positive counter value decrementing and/or the clipping to non-positive counter values of a decremented counter value could be omitted. The counter resets after saturation could be omitted.

What is claimed is:

1. A method of a processor of echo cancellation, comprising:
(a) providing a fast estimation filter, a slow estimation filter, a saturating counter, and a filter flag;
(b) filtering a frame of far-end plus near-end samples with said fast estimation filter to yield a first frame of outputs;
(c) filtering said frame of the far-end plus near-end samples with said second slow estimation filter to yield a second frame of the outputs;
(d) computing, in said processor, a measure of said first frame and a measure of said frame;
(e) when said measure of said first frame plus a predetermined value is less than said measure of said second frame, incrementing said saturating counter;
(f) when said measure of said first frame plus another predetermined value is greater than said measure of said second frame, decrementing said saturating counter;
(g) when said saturating counter is greater than or equal to a threshold, set said filter flag to said fast estimation filter and adjust slow estimation filter coefficients using fast estimation filter coefficients;
(h) when said saturating counter is less than or equal to another threshold, set said filter flag to said slow estimation filter and adjust said fast estimation filter coefficients using said slow estimation filter coefficients; and
(i) output said first frame or said second frame according to said filter flag, wherein said filter flag results in an improved echo cancellation as a result of the first estimation filter and the second estimation filter.

2. The method of claim 1, wherein: said measure of a frame is a logarithm of sum of squares of samples of the frame.

3. The method of claim 1, wherein: said fast estimation filter is updated after each far-end plus near-end sample, said update is limited relative to said fast estimation filter.

4. The method of claim 1, further comprising: when said step (f) of claim 1 decrements said saturating counter, also clip said saturating counter.

5. The method of claim 1, further comprising: when said measure of said first frame plus said other predetermined value is less than or equal to said measure of said second frame and said measure of said first frame plus said other predetermined value is less than or equal to said measure of said second frame, decrementing said saturating counter if said saturating counter is greater than a threshold.

6. The method of claim 1, further comprising: when said step (g) of claim 1 sets said filter flag also reset said saturating counter.

7. The method of claim 1, further comprising: when said step (h) of claim 1 sets said filter flag, also reset said saturating counter.

* * * * *